US010963295B2

(12) United States Patent
Feehrer et al.

(10) Patent No.: US 10,963,295 B2
(45) Date of Patent: Mar. 30, 2021

(54) HARDWARE ACCELERATED DATA PROCESSING OPERATIONS FOR STORAGE DATA

(71) Applicant: Oracle International Corporation, Redwood City, CA (US)

(72) Inventors: John R. Feehrer, Westford, MA (US); Milton Shih, Westford, MA (US); Matthew Cohen, Cambridge, MA (US); Kenneth Chan, Saratoga, CA (US); Ramaswamy Sivaramakrishnan, San Jose, CA (US); Julia Harper, Arlington, MA (US); Peter Dunlap, Boulder, CO (US)

(73) Assignee: Oracle International Corporation, Redwood Shores, CA (US)

( * ) Notice: Subject to any disclaimer, the term of this patent is extended or adjusted under 35 U.S.C. 154(b) by 157 days.

(21) Appl. No.: 15/699,027

(22) Filed: Sep. 8, 2017

(65) Prior Publication Data
US 2019/0079795 A1 Mar. 14, 2019

(51) Int. Cl.
*G06F 9/48* (2006.01)
*G06F 21/60* (2013.01)
(Continued)

(52) U.S. Cl.
CPC ........... *G06F 9/4881* (2013.01); *G06F 9/485* (2013.01); *G06F 11/0727* (2013.01);
(Continued)

(58) Field of Classification Search
CPC .... G06F 9/485; G06F 9/4881; G06F 11/0727; G06F 11/0769; G06F 13/4282; G06F 13/4295; G06F 21/602
(Continued)

(56) References Cited

U.S. PATENT DOCUMENTS 5,481,707 A * 1/1996 Murphy, Jr. .......... G06F 9/5027
710/1
6,237,079 B1 5/2001 Stoney
(Continued)

OTHER PUBLICATIONS

R. Belli and T. Hoefler, "Notified Access: Extending Remote Memory Access Programming Models for Producer-Consumer Synchronization," 2015 IEEE International Parallel and Distributed Processing Symposium, Hyderabad, 2015, pp. 871-881. (Year: 2015).*

(Continued)

*Primary Examiner* — Andrew M. Lyons
(74) *Attorney, Agent, or Firm* — Kowert, Hood, Munyon, Rankin & Goetzel, P.C.

(57) ABSTRACT

A method and system for processing data are disclosed. A processor, in response to executing a software program, may write an entry in a work queue. The entry may include an operation, and a location of data stored in an input buffer, and a location in an output buffer to write processed data. The processor may also generate a notification that at least one entry in the work queue is ready to be processed. The data transformation unit may assign the entry to a data transformation circuit, and retrieve the data from the input buffer using the location. The data transformation unit may also perform to the operation on the retrieved data to generate updated data, generate a completion message in response to completion of the operation, and store the updated data in an output buffer. An interface unit may relay transactions between the processor and the data transformation unit.

20 Claims, 9 Drawing Sheets

(51) Int. Cl.
*G06F 11/07* (2006.01)
*G06F 13/42* (2006.01)
*G06F 11/10* (2006.01)

(52) U.S. Cl.
CPC ...... *G06F 11/0769* (2013.01); *G06F 11/1004* (2013.01); *G06F 13/4282* (2013.01); *G06F 13/4295* (2013.01); *G06F 21/602* (2013.01)

(58) Field of Classification Search
USPC ........................................................ 718/101
See application file for complete search history.

(56) References Cited

U.S. PATENT DOCUMENTS

| | | | | |
|---|---|---|---|---|
| 6,604,158 B1* | 8/2003 | Fallon | ................... | G06F 3/0608 709/246 |
| 6,704,871 B1 | 3/2004 | Kaplan | | |
| 7,099,884 B2* | 8/2006 | Gu | ...................... | H03M 7/3086 |
| 7,594,002 B1* | 9/2009 | Thorpe | ................... | H04L 47/10 370/392 |
| 7,653,710 B2* | 1/2010 | Scheuermann | ........... | G06F 9/52 709/223 |
| 7,924,828 B2* | 4/2011 | Hass | ....................... | H04L 49/90 370/389 |
| 7,941,570 B2* | 5/2011 | Flanagan | .............. | G06F 13/126 710/20 |
| 7,987,229 B1* | 7/2011 | Kinne | ................. | H04L 67/1097 709/200 |
| 8,364,853 B2* | 1/2013 | Bubb | ................... | G06F 13/382 709/201 |
| 8,370,622 B1* | 2/2013 | Dattatreya | ............... | H04L 9/28 713/151 |
| 8,429,738 B1* | 4/2013 | Hughes | ................. | G06F 9/4843 380/30 |
| 8,825,885 B2* | 9/2014 | Kruse | .............. | H04L 29/08072 709/230 |
| 9,460,019 B2* | 10/2016 | Debbage | ............. | G06F 12/0875 |
| 9,667,422 B1* | 5/2017 | Androulaki | ......... | G06F 12/1408 |
| 10,073,977 B2* | 9/2018 | Pappachan | .............. | G06F 13/28 |
| 10,127,624 B1* | 11/2018 | Lassahn | ................... | G06F 12/02 |
| 2003/0021228 A1* | 1/2003 | Nakano | ................. | G06F 9/4881 370/229 |
| 2003/0033487 A1* | 2/2003 | Pfister | ................. | G06F 12/0817 711/144 |
| 2004/0109186 A1* | 6/2004 | Shindoh | ................ | G06F 3/1214 358/1.13 |
| 2007/0157030 A1* | 7/2007 | Feghali | ................. | G06F 21/602 713/189 |
| 2007/0192547 A1* | 8/2007 | Feghali | ................. | G06F 9/3001 711/154 |
| 2008/0005429 A1* | 1/2008 | Ludwig | ................. | G06F 13/385 710/68 |
| 2008/0155139 A1 | 6/2008 | Chew | | |
| 2010/0031056 A1* | 2/2010 | Harada | ................. | G06F 21/602 713/193 |
| 2010/0322512 A1* | 12/2010 | Huang | ................. | H04N 19/186 382/166 |
| 2011/0208833 A1* | 8/2011 | Fallon | ................... | H04N 9/8042 709/217 |
| 2011/0296440 A1* | 12/2011 | Laurich | ................. | G06F 21/602 719/326 |
| 2012/0079281 A1* | 3/2012 | Lowenstein | .......... | G06F 21/602 713/189 |
| 2012/0151222 A1* | 6/2012 | Koifman | ............. | G06F 12/1408 713/189 |
| 2012/0297083 A1* | 11/2012 | Ferguson | ................ | H04L 45/00 709/233 |
| 2013/0024632 A1* | 1/2013 | Amit | ..................... | G06F 16/116 711/154 |
| 2013/0191651 A1* | 7/2013 | Muff | ................... | G06F 12/1027 713/193 |
| 2013/0238931 A1* | 9/2013 | Suzuki | ............... | G06F 11/1068 714/15 |
| 2013/0322336 A1* | 12/2013 | Cheng | ..................... | H04W 8/00 370/328 |
| 2014/0149637 A1* | 5/2014 | Gu | ......................... | G06F 13/28 711/103 |
| 2014/0325098 A1* | 10/2014 | Boyd | .................. | G06F 3/0683 710/54 |
| 2015/0012606 A1* | 1/2015 | Gadipudi | .............. | H04L 47/193 709/212 |
| 2015/0081956 A1* | 3/2015 | Vucinic | ..................... | G06F 5/10 711/103 |
| 2015/0127763 A1* | 5/2015 | Pope | ................. | G06F 15/17331 709/212 |
| 2016/0283398 A1* | 9/2016 | Abali | .................. | G06F 12/1018 |
| 2016/0342545 A1* | 11/2016 | Arai | .................. | G06F 12/0868 |
| 2017/0220812 A1* | 8/2017 | Lopez | .................. | G06F 21/602 |
| 2017/0242768 A1* | 8/2017 | Park | ...................... | G06F 3/0619 |
| 2017/0371811 A1* | 12/2017 | Noyes | ................... | G06F 9/4498 |
| 2018/0011656 A1* | 1/2018 | Guilford | ................ | H03M 7/40 |
| 2018/0152201 A1* | 5/2018 | Gopal | ................. | H04L 41/0816 |
| 2018/0246826 A1* | 8/2018 | Feehrer | ............... | G06F 13/4068 |
| 2018/0300064 A1* | 10/2018 | McGlaughlin | ........ | G06F 3/0611 |
| 2018/0307533 A1* | 10/2018 | Tian | ...................... | G06F 9/4831 |
| 2018/0341410 A1* | 11/2018 | Benisty | ................. | G06F 3/0611 |
| 2019/0065788 A1* | 2/2019 | Vijayasankar | ........ | G06F 3/0608 |

OTHER PUBLICATIONS

B. Blaner et al., "IBM POWER7+ processor on-chip accelerators for cryptography and active memory expansion," in IBM Journal of Research and Development, vol. 57, No. 6, pp. 3:1-3:16, Nov.-Dec. 2013. (Year: 2013).*

B. Klenk, L. Oden and H. Froening, "Analyzing Put/Get APIs for Thread-Collaborative Processors," 2014 43rd International Conference on Parallel Processing Workshops, Minneapolis, MN, 2014, pp. 411-418. (Year: 2014).*

M. LeBeane et al., "Extended Task Queuing: Active Messages for Heterogeneous Systems," SC '16: Proceedings of the International Conference for High Performance Computing, Networking, Storage and Analysis, Salt Lake City, UT, 2016, pp. 933-944. (Year: 2016).*

* cited by examiner

HARDWARE ACCELERATED DATA PROCESSING OPERATIONS FOR STORAGE DATA

BACKGROUND

Technical Field

This invention relates to computing systems, and more particularly, to techniques for processing data in a computing system.

Description of the Related Art

Computing systems include multiple multi-threaded processors that may retrieve and execute program instructions from memory. The program instructions may be part of software programs or applications, and may be designed to perform particular functions, such as word processing, sending and receiving electronic mail, and the like. During execution of such a software program, instructions included in the software program may send data to, or receive data from one or more devices included in, or coupled to, the computing system.

The devices associated with a computing system may perform various functions. For example, one class of devices may include ethernet network interface cards (NICs) that allow the computing system to communicate with other computing systems, and other devices either internal or external to the computing system, such as printers, for example.

Other devices may include storage devices for storing data not currently in use by the computing system. The storage devices may include traditional hard disk drives (HDDs), solid-state drives (SSDs), Storage Area Network (SANs), or Network Attached Storage (NAS), or other suitable storage devices. Multiple drives may be arranged in arrays to form redundant arrays of inexpensive disks (RAIDs) to allow for storing information in a redundant fashion to improve reliability.

SUMMARY OF THE EMBODIMENTS

Various embodiments of an apparatus and method for handling interrupts in a computing system are disclosed. Broadly speaking, a method and system are contemplated in which a processor, in response to executing a software program, may write an entry in a work queue, where the entry includes an operation, and a location of data stored in an input buffer included in a memory. The processor may also generate a notification that at least one entry in the work queue is ready to be processed. A data transformation unit may assign the entry in the work queue to a data transformation circuit in response to receiving the notification, and retrieve the data from the input buffer using the location. The data transformation unit may also perform operations on the retrieved data to generate updated data, generate a completion message in response to completion of the operation, and store the updated data in an output buffer included in the memory. An interface unit may relay transactions between the processor and the data transformation unit.

In a non-limiting embodiment, the operation is a fused operation that includes a first operation and a second operation.

In another embodiment, the retrieved data includes encrypted compressed data, and an associated checksum value, and the first operation is a decryption operation and the second operation is a decompression operation. To perform the operation, the data transformation unit may decrypt the retrieved data to generate decrypted data, decompress the decrypted data to generate decompressed data, and generate a secure hash using the retrieved data.

Figure 1:
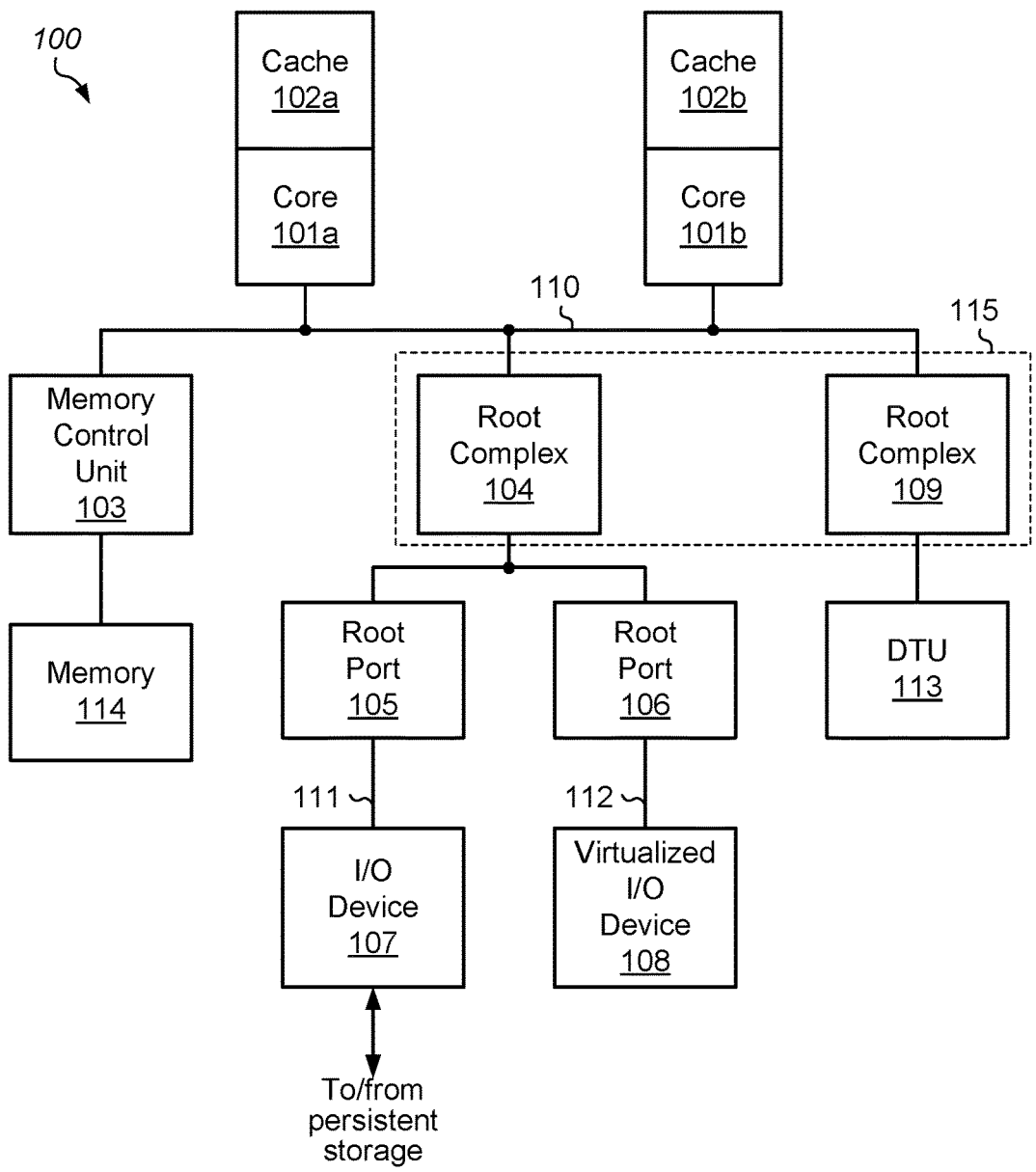
FIG. 1 is a block diagram of an embodiment of a processor.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Distributed cloud computing environments, have generated a need for increased storage efficiency and security. In some cases, storing data in persistent storage media in a compressed format may increase storage efficiency. Before such data may be stored in the persistent storage, multiple data transformations may have to be performed. For example, in some cases, data may be compressed, and then encrypted. A checksum using a secure hash algorithm (SHA) may be generated for the encrypted data for added security.

The aforementioned transformations are computationally expensive, and can limit the movement of data between a CPU, or other compute nodes, and the storage devices. In cases where a CPU executing software instructions from a library performs the transformations, the computational cost associated with the transformations may be particularly high. Some computing systems employ dedicated hardware designed to accelerate the transformations. Such dedicated hardware may be included within a CPU or within separate application specific integrated circuits (ASICs) or field-programmable gate arrays (FPGAs). Even though the dedicated hardware is able to offload the CPU, the hardware is only capable of performing a single operation and places a burden on memory subsystems and interconnect between the CPU and the hardware resulting from storing and re-fetching intermediate results between operations. The embodiments illustrated in the drawings and described below may provide techniques for accelerating data transformations while reducing the burden on the memory subsystems and the interconnect between the CPU and the accelerator hardware.

An example of a computing system is depicted in FIG. 1. In the illustrated embodiment, computing system 100 includes processor cores 101a and 101b. It is noted that although two cores are shown, in various embodiments, any suitable number of processor cores may be employed. Each of cores 101a-b is coupled to a respective one of cache partitions 102a-b. Cores 101a-b are coupled to each other and to memory control unit 103, and interface unit 115 via network 110. Network 110 may be a point-to-point network, ring-based network, or any other suitable network configuration that allows for communication between processor cores 101a-b, memory control unit 103 and root complexes 104 and 109. In some embodiments, network 110 may include a multi-wire parallel bus, and requests and responses between the various devices may be transmitted via the multi-wire parallel bus using any suitable communication protocol.

Cores 101a-b may be configured to execute software programs or applications according to a particular instruction set architecture (ISA). During execution of the software programs, data may be retrieved from persistent storage, such as, e.g., flash memory arrays, and the like, and loaded into memory 114. Such data may be compressed and/or encrypted when stored in persistent storage. Before the data may be used, it must be decompressed and decrypted.

To accomplish this, a software program may store the data to be processed in an input buffer data structure included in memory 114, and generate an entry in a work queue data structure that specifies one or more operations to be performed on the data, also located in memory 114. Once these tasks have been accomplished, the software program may notify a data translation unit (DTU) 113 that data is ready to be processed. The notification may be performed by sending a transaction via network 110 to interface unit 115, which relays the transaction to DTU 113. In various embodiments, interface unit 115 includes one or more Root Complexes configured to translate the transaction from the communication protocol of network 110 to a communication protocol used by an endpoint device. In the present embodiment, interface unit 115 includes Root Complexes 104 and 109, where Root Complex 109 is configured to relay transactions from cores 101a-b to DTU 113.

As described below in more detail, once DTU 113 receives a notification of data to process, DTU 113 performs the specified operations. By offloading the processing of the data retrieved from persistent storage to DTU 113, compute resources of cores 101a-b remain available to perform other functions. Upon completion of the performing the operations, DTU 113 stores the resultant data in an output buffer data structure in memory 114, and notes the completion of the processing, by updating a corresponding entry in a completion queue data structure, also stored in memory 114. The software program, upon noting the processing has been completed, may retrieve the data from the output buffer data structure for further processing, or any other suitable use.

Although the above description involves retrieving data from persistent storage, and pre-processing the retrieved data for further use by a software application, DTU 113 may also be used for data flowing in the opposite direction, i.e., to compress and/or encrypt data, prior to the data being stored in persistent storage.

In one embodiment, cores 201a-b may be configured to implement the SPARC® V9 ISA, although in other embodiments it is contemplated that any desired ISA may be employed, such as x86, ARM, PowerPC® or MIPS®, for example. In the illustrated embodiment, each of cores 101a-b may be configured to operate independently of the others, such that all cores 101a-b may execute in parallel. Additionally, in some embodiments each of cores 101a-b may be configured to execute multiple hardware execution threads (or simply "threads") concurrently, where a given thread may include a set of instructions that may execute independently of instructions from another thread. (For example, an individual software process, such as an application, may have its tasks distributed over one or more threads by an operating system.) A core capable of executing multiple execution threads may be referred to as a multithreaded (MT) core.

Cache memory partitions 102a-b may, in various embodiments, collectively form a level 3 (L3) cache memory for DTU 200. The multiple cache memory partitions need to maintain coherency with respect to each other. Cache memory partitions 102a-h may, in various embodiments, implement one of numerous coherency protocols, such as, e.g., MOESI, MESI, or any suitable cache coherency protocol.

Each of cache memory partitions 102a-b may be configured to cache instructions and data for use by cores 101a-b. In the illustrated embodiment, each of cache memory partitions 102a-b may be separately addressable and independently accessed, may concurrently return data to a respective core of cores 101a-b. In some embodiments, each individual cache memory partition may be implemented using set-associative or direct-mapped techniques. For example, in one embodiment, each of cache memory partitions 102a-h may be an 8 megabyte (MB) cache, although other cache sizes and organizations are possible and contemplated.

Memory control unit 103 may be configured to manage the transfer of data between cache partitions 102a-b and system memory in response to fill requests and data evictions. Memory control unit 103 may be configured to interface to any suitable type of system memory, such as described above in reference to FIG. 1. In some embodiments, memory control unit 103 may be configured to support interfacing to multiple different types that may be included in memory 114.

Memory 114 may include any suitable type of memory. For example, in some embodiments, memory 114 may include dynamic random access memory (DRAM), static random access memory (SRAM), non-volatile memory (NVM), or any other suitable type of memory. As described below in more detail, memory 114 may include one or more data structures, such as, e.g., a work queue, that may be employed by DTU 113 during the processing of data retrieved from persistent storage, or to be stored in persistent storage.

Root Complexes 104 and 109 may conform to the peripheral component interface express (PCIe) standard, and are configured, along with and Root Ports 105 and 106, to transfer data between cores 101a and 101b, and other devices. It is noted that although two Root Complexes and two Root Ports are shown in the present embodiment, other embodiments may include any suitable number of Root Complexes and Ports.

Root Complex 104 may, in various embodiments, be configured to relay requests and responses (collectively "transactions") between cores 101*a-b* and devices coupled to Root Ports 105 and 106, and Root Complex 109 may be configured to relay transactions between cores 101*a-b* and DTU 113. Since transactions may be formatted differently on the network 110 than what the aforementioned devices are capable of receiving, Root Complex 104 may translate the transactions from the communication protocol of network 110 to a communication protocol compatible with a device coupled to one of Root Ports 105 and 106. The translation of a transaction may include the translation of an address from the address space of cores 101*a-b* to a device address space, as well as the conversion of multi-bit data words into data packets to be transmitted in a serial fashion.

It is noted that in the present embodiment, Root Complexes 104 and 109 include circuit blocks specific to the PCIe communication protocol as a particular example to aid in explanation. In other embodiments, any suitable communication protocol may be employed, such as, Peripheral Component Interface (PCI) and Accelerated Graphics Port (AGP), for example.

Each of Root Ports 105 and 106 may be configured to relay a translated transaction to a particular device in accordance with a particular communication protocol. In some embodiments, Root Port 105 may be configured to relay a translated transaction via link 111 to I/O device 107, which, in turn, relays the transaction to persistent storage. In various embodiments, Root Port 105 may transmit the translated transaction to the device using one of various communication protocols, such as the PCIe communication protocol, for example. Such transactions may be sent outside of computing system 100.

Root Port 106 is coupled to virtualized device 108 via virtual link 112. As described below in more detail, virtualized device 108 may include circuitry configured to perform multiple functions, each of which may be accessed by separate Guest Operation Systems (GOS) being executed by one of cores 101*a-b*, thereby allowing the hardware resources of virtualized device 108 to be shared among multiple software processes.

DTU 113 is configured to retrieve information stored in an input buffer data structure in memory 114, operate upon the data as specified by a work queue entry, and store the resultant data to an output buffer data structure in memory 114. As described below in more detail, DTU 113 may include multiple data transformation engine (DTE) circuits to allow for multiple portions of data to processed in parallel. Some of the DTE circuits may be able to sequentially perform two or more operations without returning the intermediate result data to memory 114 between operations. To enable such processing, the software program may specify a fused operation, which is defined as a sequence of includes multiple operations that are to be performed in cascade fashion. By allowing a DTE circuit to use fused operations, extra traffic into and out of memory 114 may be reduced, thereby improving system performance and increasing the speedup of hardware acceleration over a software implementation.

It is noted that the embodiment illustrated in FIG. 1 is merely an example. In other embodiments, different devices, different numbers of cores, caches and devices, and different configurations of cores, caches, and devices are possible and contemplated.

To accomplish the execution of operations on data as described above, a DTU includes multiple different circuit blocks. An embodiment of a DTU is depicted in the block diagram of FIG. 2. In various embodiments, DTU 200 may correspond to DTU 113 of the embodiment illustrated in FIG. 1. In the illustrated embodiment, DTU 200 includes scheduler/endpoint circuit 201, and data transformation engine (DTE) circuits 202*a-c*.

Scheduler/endpoint circuit 201 is configured to perform two primary functions. First, scheduler/endpoint circuit 201 is configured to function as an endpoint for an I/O communication network, such as PCI-Express, for example. In some embodiments, scheduler/endpoint circuit 201 may be configured to initiate transactions or respond to transactions delivered via a PCI-Express Root Complex, such as, Root Complex 109 as illustrated in FIG. 1, for example.

Additionally, scheduler/endpoint circuit 201 may be configured to assign processing tasks associated with a particular work queue entry to a particular one of DTE 202*a-c*. In various embodiments, scheduler/endpoint circuit 201 may make such assignments in response to receiving a programmed Input/Output (PIO) write initiated by a software program or application being executed on one or more of cores 101*a-b*. Upon receiving the PIO write, scheduler/endpoint circuit 201 may check a scoreboard (not shown) or other data structure indicating which entries in the work queue are ready for processing. Scheduler/endpoint 201 may then assign a particular entry in the work queue that is ready for processing to an available one of DTEs 202*a-c* using any suitable arbitration scheme, such as fair-round robin, for example.

Scheduler/endpoint 201 may be designed according to one of various design techniques. In various embodiments, scheduler/endpoint circuit 201 may include any suitable combination of static logic gates, storage circuits, and sequential logic circuits.

Figure 2:
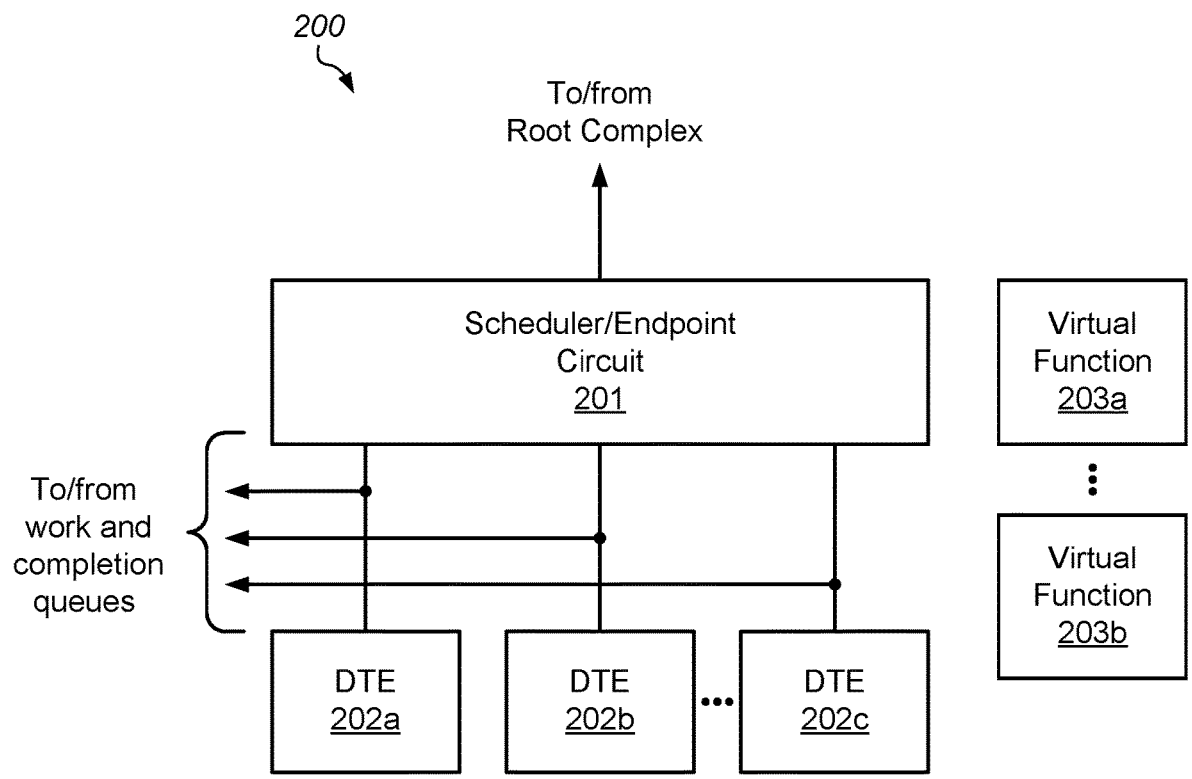
FIG. 2 is a block diagram of an embodiment of a data transform unit (DTU).

As described below in more detail in regard to FIG. 3, DTEs 202*a-c* are configured to perform operations specified in work queue entries. In various embodiments, such operations may include, without limitation, encryption, decryption, compression, and decompression. In some cases, at DTE may also be configured to generate secure hashes (checksums), as well as verify generated checksum values against checksums stored with the data in the input buffer. Although three DTEs are depicted in the embodiment of FIG. 2, in other embodiments, any suitable number of DTEs may be employed.

Upon the completion of assigned operations, DTEs 202*a-c* may write an entry in a completion queue to signal the completion of the work requested in a corresponding work queue entry. In addition to writing an indication that the work has been completed, DTEs 202*a-c* may additionally store data indicative of any errors that occurred while performing the operation(s). In some cases, DTEs 202*a-c*, in conjunction with scheduler/endpoint circuit 201, may generate a PCIe Message Signaled Interrupt (MSI), or other suitable interrupt to signal the initiating software program that the requested operations have been performed.

Multi-processor computing systems may support the use of one or more virtual machines, each running a respective Guest Operating System (GOS). Hardware resources, such as, e.g., DTEs 202*a-c*, included in a DTU may be shared between the various GOSs. During operation of such multi-processor computing systems, there may be many requests generated by software programs executing within the GOSs to retrieve data from persistent storage and perform transformation operations.

To allow for DTEs 202*a-c* to be shared between different GOSs, DTU 200 includes multiple virtual functions 203*a-b*. Each of virtual functions 203*a-b* may be mapped to a particular instance of a GOS, thereby allowing the hardware resources associated with DTU 200 to be shared between different GOSs. Although only two virtual functions are depicted in the embodiment of FIG. 2, in other embodiments, any suitable number of virtual functions may be employed.

It is noted that the embodiment of FIG. 2 is merely an example. In other embodiments, different circuit blocks, and different arrangements of circuit blocks are possible and contemplated.

To perform the operations specified in a given work queue entry, multiple DTEs may be employed. By using multiple DTEs, a DTU can schedule different data processing operations to be executed in parallel, thereby improving system performance, while reducing the load on a processor or processor cores included in the computing system. A particular embodiment of a DTE is illustrated in the block diagram of FIG. 3. In various embodiments, DTE 300 may correspond to any of DTEs 202a-c as depicted in FIG. 2. In the illustrated embodiment, DTE 300 includes communication circuit 301, compression/decompression circuit 302, encryption/decryption circuit 303, and secure hash circuit 304.

Communication circuit 301 is configured to relay information received from scheduler/endpoint circuit 201 to any one of compression/decompression circuit 302, encryption/decryption circuit 303, or secure hash circuit 304. In various embodiments, communication circuit 301 may include a crossbar switch, or other suitable circuit, configured to route information to one of the aforementioned circuit blocks.

Compression/decompression circuit 302 is configured to either compress or decompress data associated with a particular work queue entry based upon the operation included in the work queue entry. In various embodiments, compression/decompression circuit 302 may include circuits to allow for the use of multiple algorithms for compressing and decompressing data. For example, compression/decompression circuit 302 may employ one of gzip, 1z4, 1z0, or any other suitable compression or decompression algorithm. Compression/decompression circuit 302 may, in some embodiments, be able to send processed data to, or receive data from either of encryption/decryption circuit 303 or secure hash circuit 304 in order to allow for fused operations.

Encryption/decryption circuit 303 is configured to either encrypt clear data or decrypt data already encrypted based upon an operation specified in a work queue entry. Such data may be received from either compression/decompression circuit 302 or secure hash circuit 304, or may be retrieved from an input buffer, using DMA capabilities. Encryption/decryption circuit 303 may include circuits to allow for the use of multiple encryption and decryption algorithms. For example, encryption/decryption circuit 302 may employ one of AES-CFB, AES-GCM, AES-XTS, and the like.

Once encryption/decryption circuit 303 has completed either an encryption or decryption operation, the result data may be transferred to either of compression/decompression circuit 302 or secure hash circuit 304, or may be transferred to an output buffer using standard DMA capabilities.

Secure hash circuit 304 is configured to generate a secure hash (checksum) using data received from an input buffer specified in a work queue entry. Additionally, secure hash circuit 304 may be configured to verify the generated checksum value against a previously determined checksum value for the data. Secure hash circuit 304 may include circuits to allow for the use of one of various algorithms for generate the secure hash. For example, secure hash circuit 304 may generate the secure hash using SHA-256, SHA-512, or any other suitable algorithm.

Each of communication circuit 301, compression/decompression circuit 302, encryption/decryption circuit 303, and secure hash circuit 304 may be designed according to one of various design styles. For example, each of the aforementioned circuits may include any suitable combination of static logic gate, storage circuits, such as, e.g., latch or flip-flop circuits, or sequential logic circuits, configured to performed the above described functions.

Figure 3:
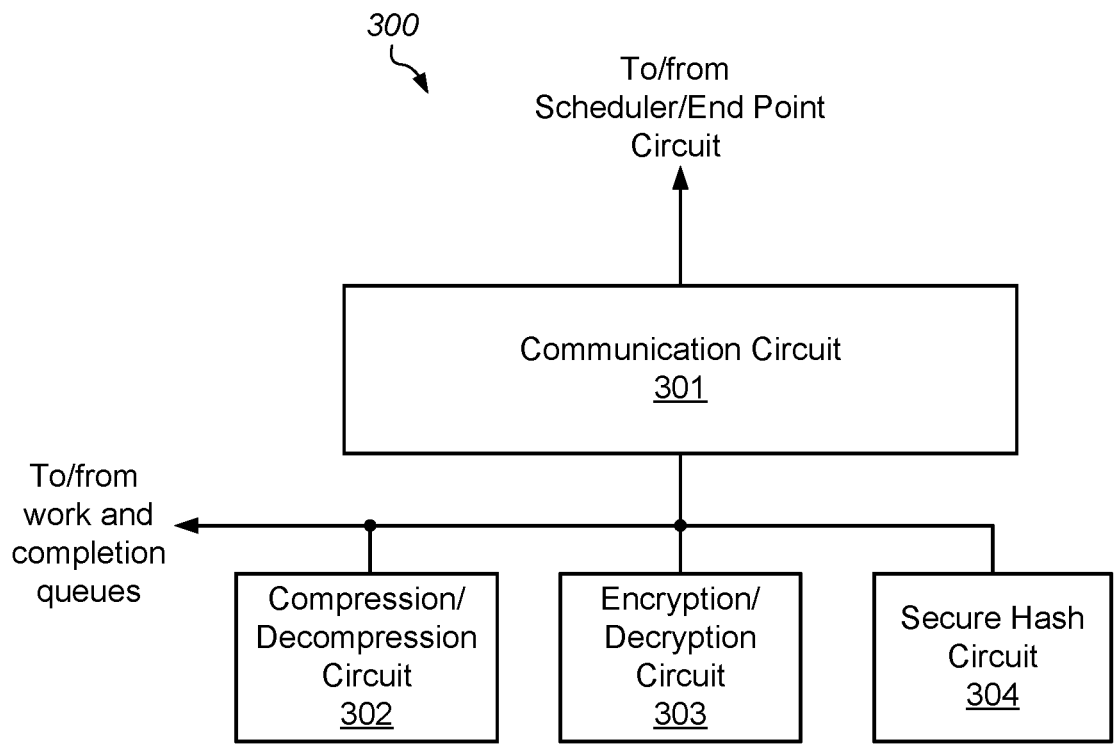
FIG. 3 is a block diagram of an embodiment of a data transform engine (DTE).

It is noted that the embodiment of FIG. 3 is merely an example. In other embodiments, different circuit blocks, and different numbers of circuit blocks may be employed.

Various data structures may be used by DTU 113 to store data and managing resources for performing operations. An embodiment of such data structures is shown in the block diagram of FIG. 4. In the illustrated embodiment, memory 400 may correspond to system memory 114 of the embodiment depicted in FIG. 1. Memory 400 includes work queues 401, completion queues 402, queue pair blocks 403, input buffers 404, and output buffers 405.

Work queues 401 may include multiple entries. A particular entry in work queues 401 may include information indicative of an operation or operations to be performed, as well as a pointer to a location in input buffers 404 where the data to be processed (transformed) is located, and a pointer to a location in output buffer 405 where the processed data is to be written. The particular entry may additionally include information indicative of a unique identifier to be used by DTU 113 for identification purposes. In various embodiments, work queues 401 may be implemented using any suitable combination of head and tail pointers, as circular buffers, and may be used by software programs or applications to specify operations to be performed on data stored in input buffers 404.

Completion queues 402 may include multiple entries, where a particular entry of the multiple entries corresponds to a particular entry of work queues 401. Upon completion of an operation or fused operation specified in the particular work entry, DTU 113 may write information indicative of the completion of the operation(s) to the corresponding entry in completion queue 402. Any errors encountered during the performance of the operation(s) may also be noted in the completion queue entry. The software application(s) that initiated the data processing request may poll completion queue 402 to determine when a specific work queue entry has been completed. Alternatively, the software application(s) may rely on PCIe MSI or other suitable interrupt generated by DTU 113 based upon request bits set in the work queue entry.

Queue pair blocks 403 includes multiple blocks, which are accessed, using a DMA read, by DTU 113 based on identifier information stored in a particular work queue entry. A particular queue pair block includes information indicative of the work queue, such as, e.g., base address, number of entries, and current head pointer, as well as information relating to the completion queue such as, base address, number of entries, and the current tail pointer, for example. DTU 113 uses the information retrieved from a particular queue block pair fetch the data included in a corresponding work queue entry, as well as determining where to store the result of operations specified in the corresponding work queue entry upon completion of the specified operation(s).

Input buffers 404 includes multiple entries, wherein a particular entry stores data associated with a corresponding work queue entry. The work queue may include an address or other suitable pointer to allow DTU 113 direct memory access to retrieve the stored in the particular entry in input buffers 404. It is noted that sizes associated with the entries in input buffers 404 may be dynamic, allowing different entries to store different quantities of data.

Like input buffers 404, output buffers 405 includes multiple entries, where a particular output buffer entry corresponds to a particular work queue entry. DTU 113 may store updated data, using DMA circuits, in a particular output buffer entry upon the completion of a fused operation, or any other suitable operation. The size of a given output buffer entry may be adjusted based on the amount of data being processed by the operations specified in the correspond work queue entry buffer. DTU 113 may include location information for the updated data when an entry in completion queues 402, corresponding to the work queue entry, is updated.

Figure 4:
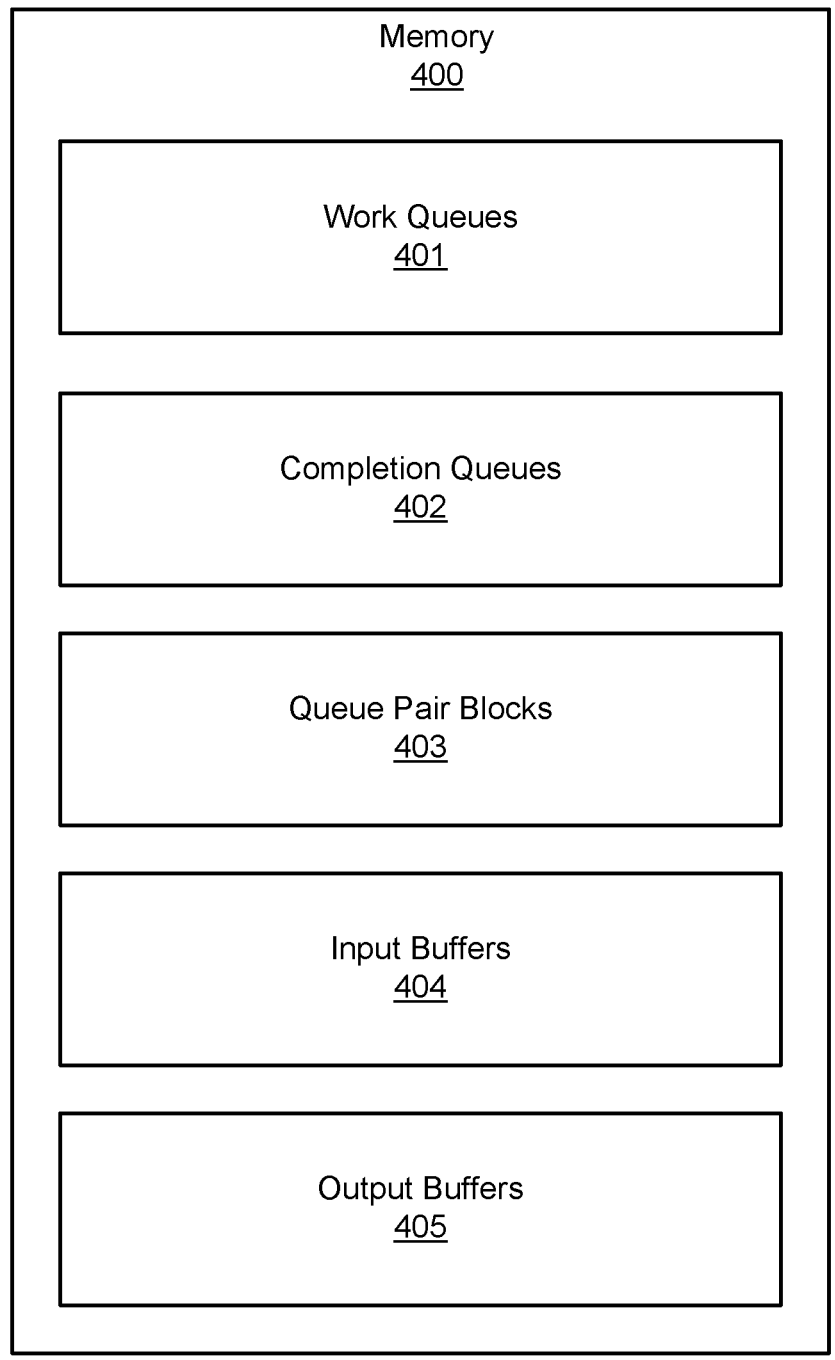
FIG. 4 is a block diagram of an embodiment of data structures in memory that may be used with a DTU.

It is noted that the embodiment depicted in FIG. 4 is merely an example. In other embodiments, different data structures, and different arrangements of data structures may be employed.

Figure 5:
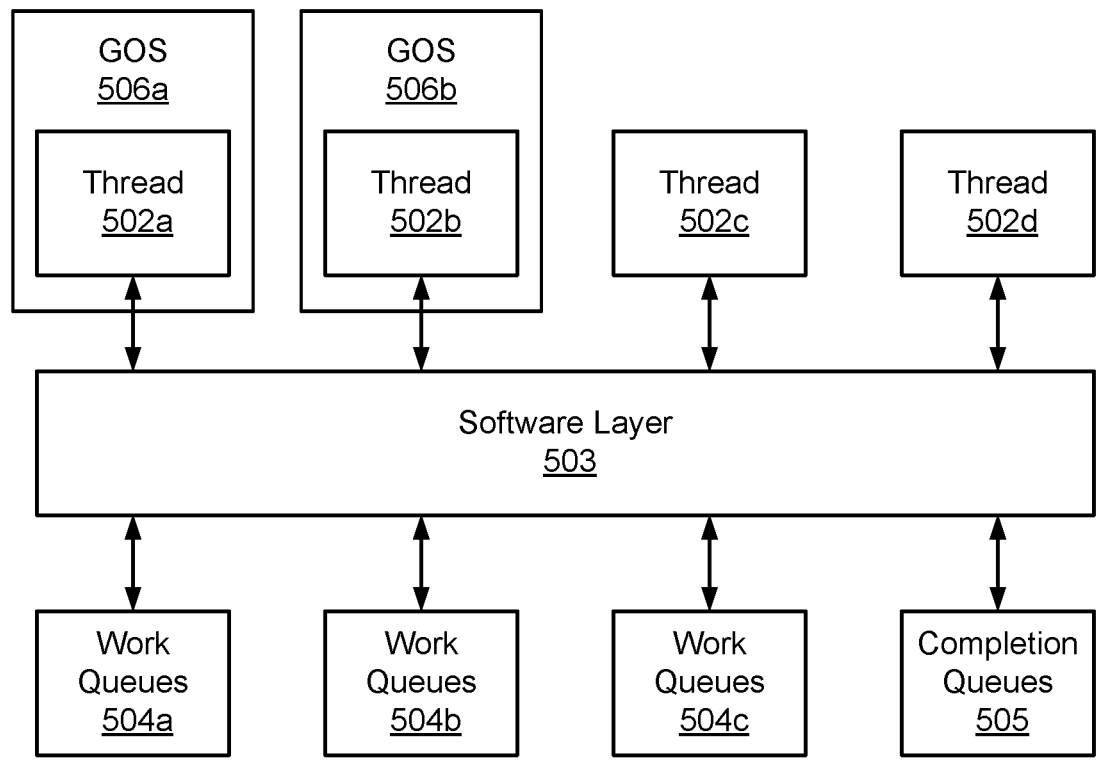
FIG. 5 is a block diagram of a software architecture for using DTUs.

A block diagram illustrating GOS instances access to work queues is depicted in FIG. 5. In the illustrated embodiment, execution threads 502a-d communicate with software layer 503. In turn, software layer 503 communicates with work queues 504a-c, and completion queue 505. In various embodiments, work queues 504a-c, and completion queue 505 may be included in the functionality of a data transform unit, such as DTU 213 as illustrated in FIG. 1, for example.

Software layer 503 (also referred to herein as a "hypervisor layer") may, in various embodiments, map access requests from execution thread 502a to work queue 504a. In a similar fashion, requests associated with execution thread 502b may be mapped to work queue 504b, and thread 502c may be mapped to work queue 504c. Each execution thread managing a work queue may also map to completion queue 505, such that each thread submits work requests to a dedicated work queue and reads completions for a dedicated completion queue.

Thread 502a is utilized by GOS 506a, and thread 502b is utilized GOS 506b. Since each of execution threads 502a and 502b are employed by different GOS instances, the work and completion queues are effectively shared between the two GOS instances. It is noted that although only two threads included in two respective GOS are depicted in the embodiment illustrated in FIG. 5, in other embodiments, any suitable number of execution threads and GOS instances may be employed.

Figure 6:
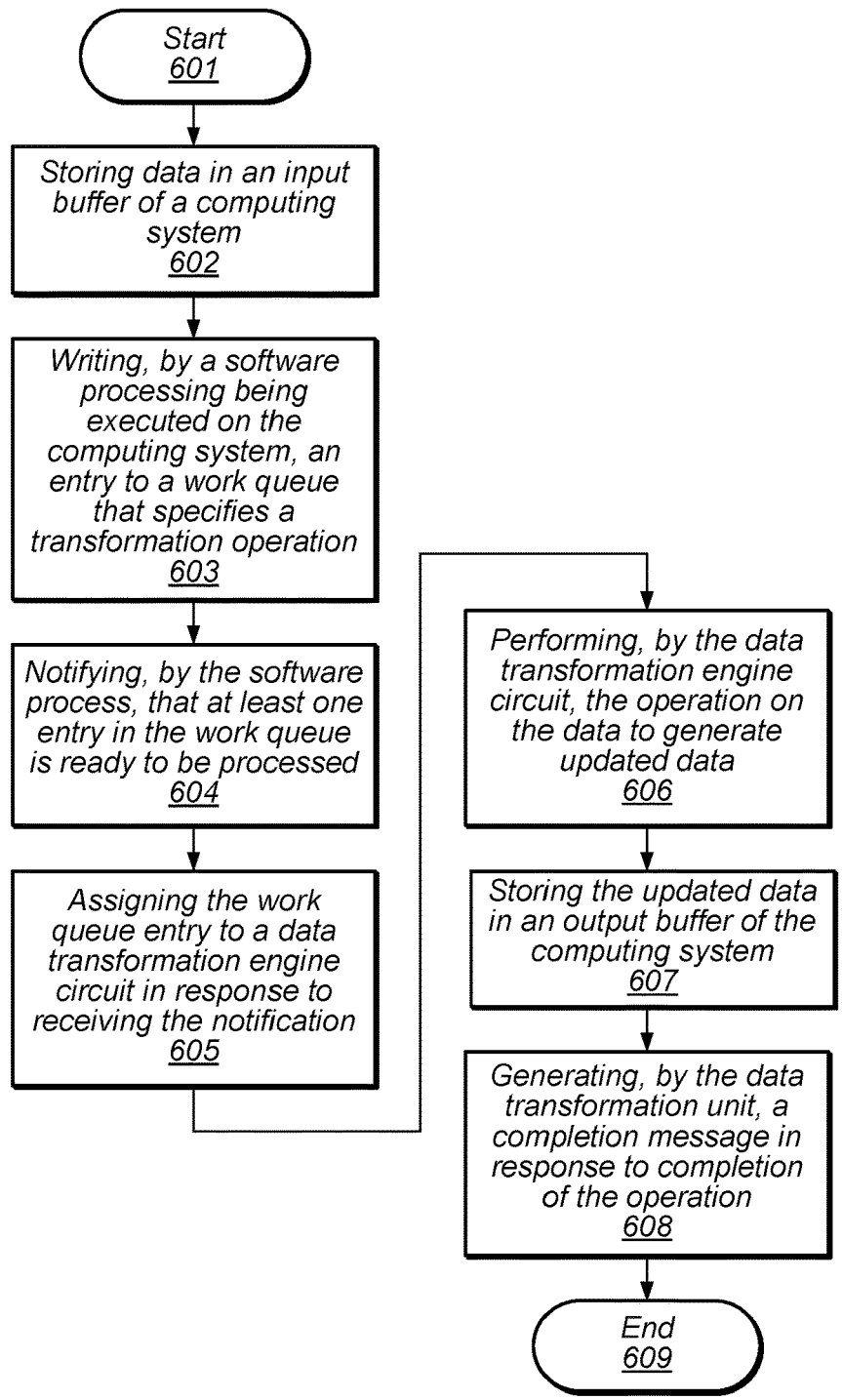
FIG. 6 illustrates a flow diagram depicting an embodiment of a method for operating a DTU.

Turning to FIG. 6, a flow diagram depicting an embodiment of a method for operating a DTU is illustrated. Referring collectively to the embodiment of FIG. 1, and the flow diagram of FIG. 6, the method begins in block 601.

One of cores 101a-b may then store data in an input buffer for DTU 113 (block 602). In various embodiments, the input buffer for DTU 113 may be located in system memory, such as memory 400, for example. Prior to storing the data in the input buffer, cores 101a-b may retrieve the data from persistent storage via I/O device 107 or virtualized I/O device 108.

In response to a software application being executed on cores 101a-b, an entry that specifies an operation may be written into a work queue (block 603). The work queue may correspond to one of work queues 401 as illustrated in the embodiment of FIG. 4. The entry may specify a type of transformation, such as, e.g., decryption, as well as a pointer to the data in the input buffer, on which the operation is to be performed, and a pointer to a location in the output buffer at which processed data is to be written.

The software application may then generate a notification that at least one entry in the work queue is ready to be processed (block 604). In various embodiments, to generate the notification, the software application may perform a programmed Input/Output (PIO) write to DTU 113. The software application may, in some cases, wait until multiple entries have been made in the work queue before performing the PIO write. The process of indicating a particular entry (or entries) in the work queue is ready to be processed may be referred to as "activating a doorbell" for the particular entry (or entries, as the case may be). A given PIO write may activate a doorbell for one or more work queue entries.

A particular work queue entry may then be assign to a particular data transformation engine circuit in response to receiving the notification (block 605). In various embodiments, a schedule circuit, such as, e.g., scheduler/endpoint circuit 201 may maintain a scoreboard data structure that includes a list of which work queue entries of work queues 401 has an active doorbell. The scheduler circuit may periodically scan the scoreboard, and assign a work queue entry to a particular one of multiple DTE, such as, e.g., DTEs 202a-c, using any suitable arbitration scheme, such as fair-round robin, for example.

The assigned DTE may then perform the desired operation on the data stored in the input buffer to generate output data (block 606). In various embodiments, the assigned DTE may used a ID associated with the work queue entry to perform a direct memory access (DMA) to retrieve a queue block pair (QBP) that includes additional information about the work queue and an associated completion queue. For example, a QBP may include information such as the work queue's base address, the number of entries in the work queue, and the current head pointer associated with the work queue, as well as similar information for the completion queue.

The updated data may then be stored in an output buffer (block 608). In various embodiments, the output buffer may correspond to a particular one of output buffers 405 included in memory 400. To store the updated data in the output buffer, DTU 113 may, in various embodiments, perform a DMA write operation.

In response to the completion of the operation, DTU 113 may then generate a completion message (block 608). To generate the completion message, DTU 113 may write an entry to completion queue 402, indicating that the operation has been completed. Alternatively, DTU 113 may generate a PCIe MSI or other suitable interrupt to signal the software program, that the operation(s) associated with the particular entry in the work queue have been completed. The method may then conclude in block 609.

It is noted that the embodiment of the method illustrated in the flow diagram of FIG. 6 is merely an example. In other embodiments, different operations and different orders of operations may be employed.

In some cases, a DTU may be employed to process data retrieved from persistent storage. Such data may, in various embodiments, be compressed and encrypted. The DTU may make use of a fused operation to allow for the decryption and decompression of the data, without having to re-store the data in memory between operations. An example of performing such a fused operation is depicted in the flow diagram of FIG. 7. In various embodiments, the method depicted in the flow diagram of FIG. 7 may correspond to block 606 of the flow diagram of FIG. 6. Referring collectively to the embodiments in FIGS. 1, 2, and 3, and the flow diagram of FIG. 7, the method begins in block 701.

DTU 113 may then retrieve the data from input buffers 404 (block 702). In various embodiments, DTU 113 may use direct memory access (DMA) circuits included within computing system 100 to access input buffers 404 in memory 400 to retrieve the data specified in the work queue entry.

Upon retrieving the data from input buffers 404, the assigned DTE of DTEs 202a-c may perform multiple operations in parallel. By performing the operations associated with the two branches in parallel, the data transform may be performed more rapidly, thereby improving system performance. In one branch, the assigned DTE decrypts the data retrieved from input buffers 404 (block 703). In various embodiments, the decryption may be performed according to any suitable decryption algorithm, such as, AES-CFB, AES-GCM, AES-XTS, for example.

Compression/decompression circuit 302 may then decompress the decrypted data to generated transformed data (block 704). In various embodiments, compression/decompression circuit 302 may decompress the data using any suitable algorithm, such as, gzip, 1z4, 1z0, and the like.

In parallel with the aforementioned branch, secure hash circuit 304 may generate a secure hash (checksum) for the data received from input buffers 404 (block 705). The secure hash may, in various embodiments, be generated according one of various algorithms. For example, secure hash circuit 304 may employ SHA-256, SHA-512, or any other suitable algorithm. Once the secure hash has been generated, secure hash circuit 304 may then verify the checksum of the data received from input buffers 404 (block 706). With the completion of the operations in both of the two aforementioned branches, the method may then conclude in block 707.

Figure 7:
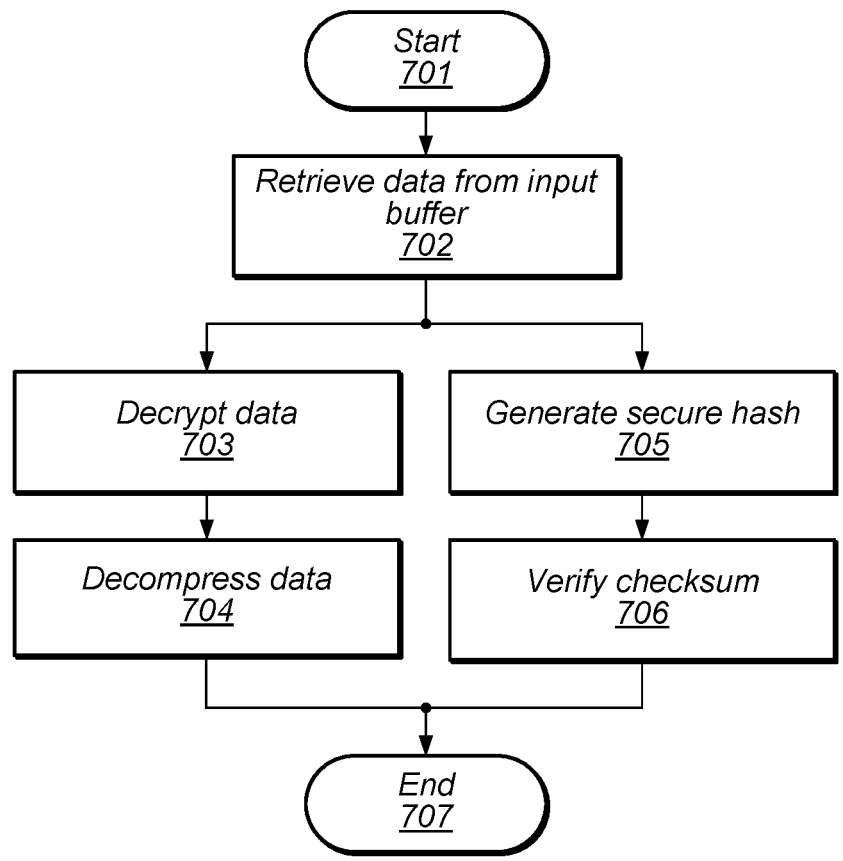
FIG. 7 illustrates a flow diagram depicting an embodiment of a method for decrypting and decompressing data.

It is noted that the embodiment of the method in FIG. 7 is merely an example. In other embodiments, different operations and different orders of operations are possible and contemplated.

Figure 8:
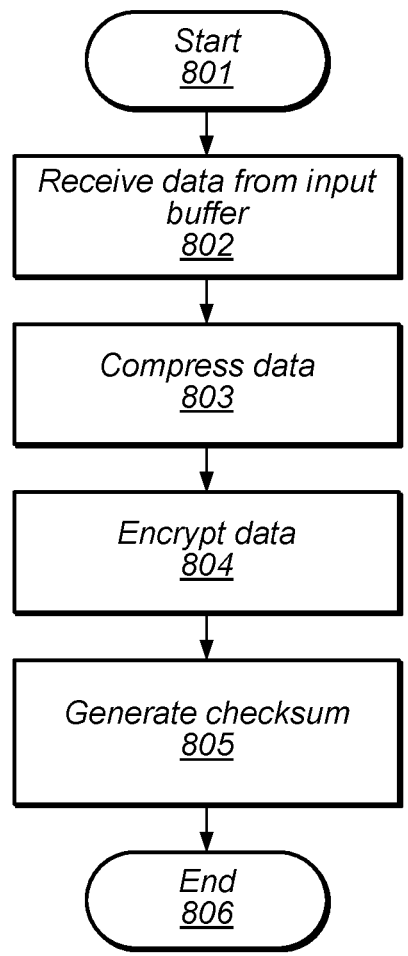
FIG. 8 illustrated a flow diagram depicting an embodiment of a method for encrypting and compressing data.

In some cases, a fused operation may be used to prepare data for storage in persistent storage. A flow diagram depicting an embodiment of a method for preparing data for storage in persistent storage is illustrated in FIG. 8. In various embodiments, the method of FIG. 8 may correspond to block 606 of the flow diagram of FIG. 6. Referring collectively to the embodiments of FIGS. 1, 2, and 3, and the flow diagram of FIG. 8, the method begins in block 801.

DTU 113 may the receive data from an input buffer such as input buffers 404, for example (block 802). Compression/decompression circuit 302 may then compress the data retrieved from input buffers 404 (block 803). In various embodiments, compression/decompression circuit 302 may compress the data using any suitable algorithm, such as, gzip, 1z4, 1z0, and the like.

Encryption/decryption circuit 303 may then encrypt the compressed data (block 804). In some embodiments, encryption/decryption circuit 303 may encrypt the compressed data using one of various algorithms such as AES-CFB, AES-GCM, AES-XTS, or any other suitable encryption algorithm. By employing compression/decompression circuit 302 and encryption/decryption circuit 303 in the above fashion, where the output of compression/decompression circuit 302 is used as input by encryption/decryption circuit 303, the compression and encryption operations may be fused into a single operation, thereby saving the execution of separate program instructions to perform each operation.

To facilitate the detection of errors that may occur in the compressed and encrypted data while that data is stored in the persistent storage, secure hash circuit 304 may calculate a checksum for the compressed and encrypted data (block 805). Secure hash circuit 304 may, in various embodiments, calculate the checksum according to a particular one of multiple algorithms. For example, secure hash circuit 304 may employ SHA-256, SHA-512, or any other suitable algorithm. The method may the conclude in block 806.

It is noted that, in some embodiments, the checksum value may be written to a separate buffer in memory using a DMA write. Alternatively, the checksum value may be inserted into a field included in an entry in the completion queue that is written to memory upon completion of the operation, as described in block 607 of the flow diagram of FIG. 6.

It is noted that the embodiment of the method illustrated in the flow diagram of FIG. 8 is merely an example. In other embodiments, different operations and different orders of operations may be employed.

Figure 9:
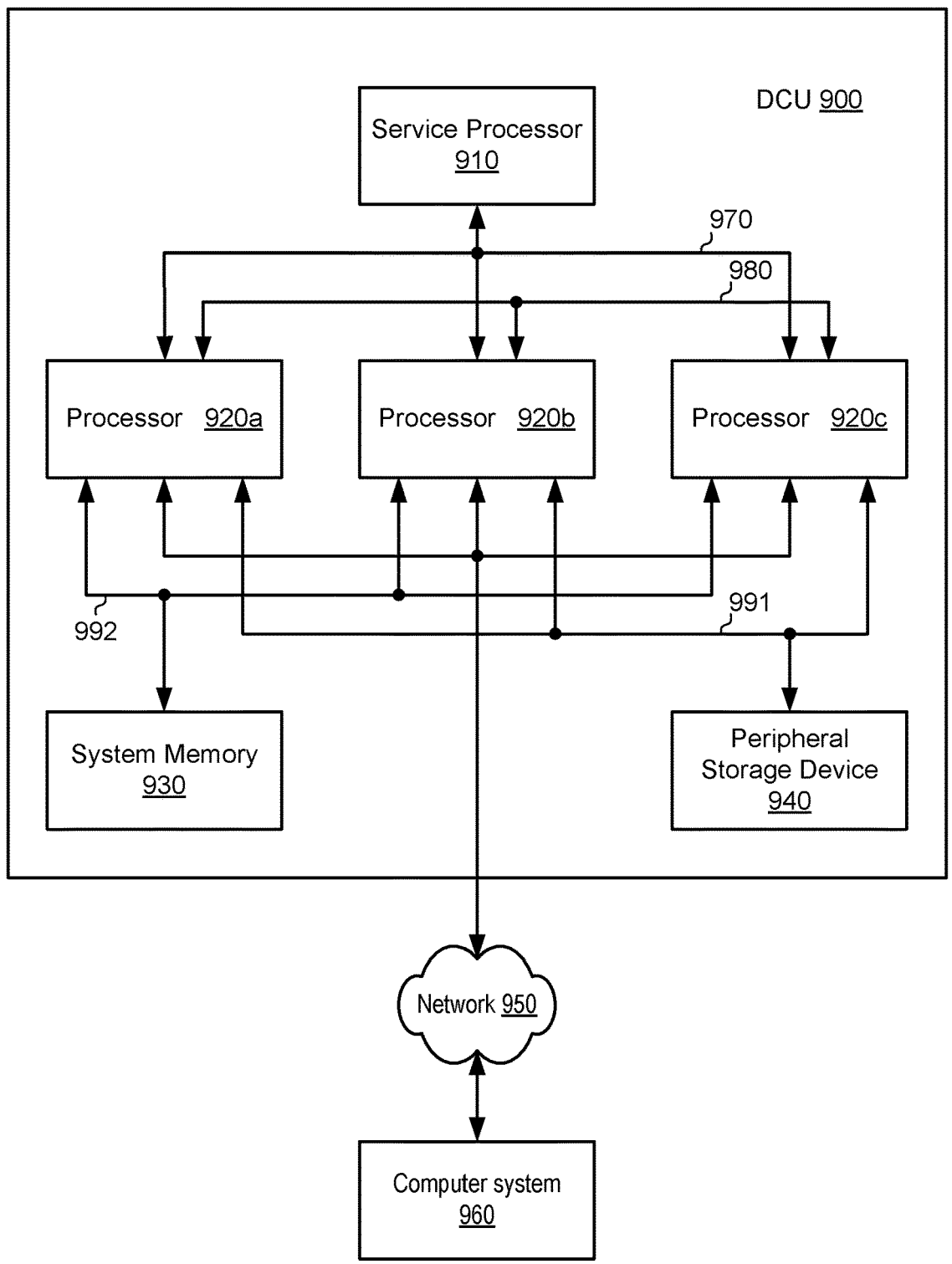
FIG. 9 is a block diagram of an embodiment of a distributed computing system.

A block diagram illustrating one embodiment of a distributed computing unit (DCU) 900 is shown in FIG. 9. In the illustrated embodiment, DCU 900 includes a service processor 910, coupled to a plurality of processors 920a-c via bus 970. It is noted that in some embodiments, service processor 910 may additionally be coupled to system memory 930 via bus 970, and may coordinate initialization and boot of processors 920a-c, such as from a power-on reset. Processors 920a-c are, in turn, coupled to system memory 930, and peripheral storage device 940. Processors 920a-c are further coupled to each other via bus 980. DCU 900 is coupled to a network 950, which is, in turn coupled to a computer system 960. In various embodiments, DCU 900 may be configured as a rack-mountable server system, a standalone system, or in any other suitable form factor. In some embodiments, DCU 900 may be configured as a client system rather than as a server system.

System memory 930 may include any suitable type of memory, such as Fully Buffered Dual Inline Memory Module (FB-DIMM), Double Data Rate, Double Data Rate 2, Double Data Rate 3, or Double Data Rate 4 Synchronous Dynamic Random Access Memory (DDR/DDR2/DDR3/DDR4 SDRAM), Rambus® DRAM (RDRAM®), or non-volatile memory (NVM), for example. It is noted that although one system memory is shown, in various embodiments, any suitable number of system memories may be employed. Each of processors 920a-c is coupled to system memory 930 via bus 992.

Storage device 940 may, in some embodiments, include magnetic, optical, or solid-state storage media such as hard drives, optical disks, non-volatile random-access memory devices, etc. In other embodiments, storage device 940 may include more complex storage devices such as disk arrays or storage area networks (SANs), which may be coupled to processors 920a-c via bus 991, which may implement a particular communication protocol, such as, a standard Small Computer System Interface (SCSI), a Fiber Channel interface, a Firewire® (IEEE 1394) interface, Peripheral Component Interface Express (PCIe), or another suitable interface. Additionally, it is contemplated that in other embodiments, any other suitable peripheral devices may be coupled to processors 920a-c, such as multi-media devices, graphics/display devices, standard input/output devices, etc.

As described in greater detail below, each of processors 920a-c may include one or more processor cores and cache memories. In some embodiments, each of processors 920a-c may be coupled to a corresponding system memory, while in other embodiments, processors 920a-c may share a common system memory. Processors 920a-c may be configured to work concurrently on a single computing task and may communicate with each other through coherent interconnect 980 to coordinate processing on that task. For example, a computing task may be divided into three parts and each part may be assigned to one of processors 920a-c. Alternatively, processors 920a-c may be configured to concurrently perform independent tasks that require little or no coordination among processors 920a-c.

The embodiment of the distributed computing system illustrated in FIG. 9 is one of several examples. In other embodiments, different numbers and configurations of components are possible and contemplated. It is noted that although FIG. 9 depicts a multi-processor system, the embodiments described herein may be employed with any number of processors, including a single processor.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
    a memory circuit;
    a processor configured to:
        maintain a work queue, a completion queue, an input buffer, an output buffer, and a supplemental data structure in the memory circuit, wherein the supplemental data structure is configured to store additional information about the work queue and the completion queue; and
        in response to executing a software program, write a particular entry in the work queue that includes a pointer to a location of input data stored in the input buffer that is to be processed, an operation to be performed on the input data, and a location to store updated data in the output buffer;
    a data transformation unit coupled to the processor, wherein the data transformation unit includes one or more data transformation circuits, and wherein the data transformation unit is configured to:
        assign the particular entry in the work queue to a particular data transformation circuit, in response to receiving a notification that at least one entry in the work queue is ready to be processed;
        access, using identification information associated with the particular entry, a portion of the additional information stored in the supplemental data structure;
        retrieve, using data in the portion of the additional information, the input data from the input buffer;
        perform the operation on the input data retrieved from the input buffer to generate updated data;
        in response to completion of the operation, write, into a corresponding entry in the completion queue using the portion of the additional information, information indicative that the operation has completed; and
        store the updated data in the output buffer using the portion of the additional information.

2. The system of claim 1, where in the operation is a fused operation including at least a first operation and a second operation.

3. The system of claim 2, wherein the input data retrieved from the input buffer includes encrypted compressed data, and an associated checksum value, wherein the first operation is a decryption operation and the second operation is a decompression operation, and wherein to perform the operation, the data transformation unit is further configured to decrypt the input data retrieved from the input buffer to generate decrypted data, decompress the decrypted data to generate decompressed data, and generate a secure hash using the input data retrieved from the input buffer.

4. The system of claim 2, wherein the first operation is a compression operation and the second operation is an encryption operation, and wherein to perform the operation, the data transformation unit is further configured to compress the input data retrieved from the input buffer to generate compressed data, encrypt the compressed data to generate encrypted data, and generate a checksum using the encrypted data.

5. The system of claim 1, wherein to generate the notification, the processor is further configured to perform a programmed Input/Output (PIO) write to the data transformation unit.

6. The system of claim 1, wherein the data transformation unit is further configured to generate a Peripheral Component Interface Express (PCIe) Message Signaled Interrupt (MSI) in response to completion of the operation, and wherein the information indicative that the operation has completed includes error data indicative of errors generated while performing the operation.

7. A method, comprising:
    storing data from an input buffer of a computing system;
    writing, by a software process being executed by the computing system, a particular entry in a work queue that includes a pointer to a location of input data stored in the input buffer, an operation to be performed on the input data, and a location to store update data an output buffer;
    notifying, by the software process, that at least one entry in the work queue is ready to be processed;
    in response to receiving a notification, assigning the particular entry in the work queue to a particular data transformation circuit of a plurality of data transformation circuits included in the computing system;
    accessing a supplemental data structure using identification information associated with the particular entry, wherein the supplemental data structure includes additional information about the work queue and a completion queue;
    performing, by the particular data transformation circuit, the operation on the input data to generate updated data using additional information;
    in response to completion of the operation, writing, into a corresponding entry of the completion queue using the additional information, information indicative that the operation has completed; and
    storing, using the additional information, the updated data in the output buffer.

8. The method of claim 7, where in the operation is a fused operation including at least a first operation and a second operation.

9. The method of claim 8, wherein the input data includes encrypted compressed data, and an associated checksum value, wherein the first operation is a decryption operation and the second operation is a decompression operation, and wherein performing the operation includes decrypting the data to generate decrypted data, decompressing the decrypted data to generate decompressed data, and generating a secure hash using the data.

10. The method of claim 8, wherein the first operation is a compression operation and the second operation is an encryption operation, and wherein performing the operation includes compressing the input data to generate compressed data, encrypting the compressed data to generate encrypted data, and generating a checksum using the encrypted data.

11. The method of claim 7, wherein notifying, by the software process, that the at least one entry in the work queue is ready to be processed includes performing a programmed Input/Output (PIO) write to a data transformation unit included in the computing system.

12. The method of claim 7, further comprising, generating a Peripheral Component Interface Express (PCIe) Message Signaled Interrupt (MSI) in response to completion of the operation.

13. The method of claim 7, wherein the information indicative that the operation has completed includes error data indicative of errors generated while performing the operation.

14. An apparatus, comprising:
a plurality of data transformation engine circuits;
a schedule circuit configured to assign a work queue entry to a particular data transformation engine circuit, in response to receiving a notification; and
wherein the particular data transformation engine circuit is configured to:
  access, using identification information associated with the work queue entry, a supplemental data structure that includes additional information about a work queue and a completion queue;
  retrieve input data from an input buffer using the additional information;
  perform, on the input data retrieved from the input buffer, an operation included in the work queue entry to generate updated data;
  in response to a determination that performance of the operation has completed, write, in a corresponding entry in a completion queue using the additional information, information indicative that the operation has completed; and
  store the updated data in an output buffer using the additional information.

15. The apparatus of claim 14, where in the operation is a fused operation including at least a first operation and a second operation.

16. The apparatus of claim 15, wherein the input data retrieved from the input buffer includes encrypted compressed data, and an associated checksum value, wherein the first operation is a decryption operation and the second operation is a decompression operation, and wherein to perform the operation, the particular data transformation engine circuit is further configured to decrypt the input data retrieved from the input buffer to generate decrypted data, decompress the data to generate decompressed data, and generate a secure hash using the input data retrieved from the input buffer.

17. The apparatus of claim 15, wherein the first operation is a compression operation and the second operation is an encryption operation, and wherein to perform the operation, the particular data transformation engine circuit is further configured to compress the input data retrieved from the input buffer to generate compressed data, encrypt the compressed data to generate encrypted data, and generating a checksum using the encrypted data.

18. The apparatus of claim 14, wherein the schedule circuit is further configured to assign the work queue entry in response to receiving a programmed Input/Output (PIO) write.

19. The apparatus of claim 14, wherein the particular data transformation engine circuit is further configured to generate a Peripheral Component Interface Express (PCIe) Message Signaled Interrupt (MSI) in response to the determination that the operation has completed.

20. The apparatus of claim 14, wherein the information indicative that the operation has completed includes error data indicative of errors generated while performing the operation.

* * * * *

UNITED STATES PATENT AND TRADEMARK OFFICE
CERTIFICATE OF CORRECTION

PATENT NO. : 10,963,295 B2  
APPLICATION NO. : 15/699027  
DATED : March 30, 2021  
INVENTOR(S) : Feehrer et al.

Page 1 of 1

It is certified that error appears in the above-identified patent and that said Letters Patent is hereby corrected as shown below:

In the Claims

In Column 14, Line 7, in Claim 2, delete "where in" and insert -- wherein --, therefor.

In Column 15, Line 1, in Claim 8, delete "where in" and insert -- wherein --, therefor.

In Column 16, Line 9, in Claim 15, delete "where in" and insert -- wherein --, therefor.

In Column 16, Line 20, in Claim 16, after "decompress the" insert -- decrypted --.

Signed and Sealed this  
Third Day of August, 2021

Drew Hirshfeld  
*Performing the Functions and Duties of the*  
*Under Secretary of Commerce for Intellectual Property and*  
*Director of the United States Patent and Trademark Office*